(12) United States Patent
Minemura et al.

(10) Patent No.: US 12,345,728 B2
(45) Date of Patent: Jul. 1, 2025

(54) AUTOMATED ANALYSIS DEVICE AND METHOD FOR LEVELING SAME

(71) Applicant: HITACHI HIGH-TECH CORPORATION, Tokyo (JP)

(72) Inventors: Yusuke Minemura, Tokyo (JP); Gorou Yoshida, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 745 days.

(21) Appl. No.: 17/642,715

(22) PCT Filed: Mar. 10, 2020

(86) PCT No.: PCT/JP2020/010145
§ 371 (c)(1),
(2) Date: Mar. 14, 2022

(87) PCT Pub. No.: WO2021/053858
PCT Pub. Date: Mar. 25, 2021

(65) Prior Publication Data
US 2022/0326269 A1 Oct. 13, 2022

(30) Foreign Application Priority Data
Sep. 19, 2019 (JP) .................. 2019-170193

(51) Int. Cl.
*G01N 35/10* (2006.01)
*G01N 35/00* (2006.01)

(52) U.S. Cl.
CPC ... *G01N 35/1011* (2013.01); *G01N 35/00069* (2013.01); *G01N 35/1002* (2013.01);
(Continued)

(58) Field of Classification Search
CPC ......... G01N 35/1011; G01N 35/00069; G01N 35/1002; G01N 35/1065;
(Continued)

(56) References Cited

FOREIGN PATENT DOCUMENTS

| JP | 01-227065 A | 9/1989 |
|----|-------------|--------|
| JP | 03-285170 A | 12/1991 |

(Continued)

OTHER PUBLICATIONS

JP-2012117950-A English Translation (Year: 2024).*
(Continued)

*Primary Examiner* — Jennifer Wecker
*Assistant Examiner* — Jonathan Bortoli
(74) *Attorney, Agent, or Firm* — MATTINGLY & MALUR, PC (57) ABSTRACT

An automated analysis device has a reaction container constructed on a reaction disc, a reaction tank for immersing the reaction container in water, a water level sensor, a reagent probe that suctions/discharges a reagent to the reaction container, and a controller. In the reagent probe, a water detection unit that detects the presence of water is provided at a prescribed site, the reagent probe being capable of detecting the water level in the reaction tank. The controller detects the water level in the reaction tank in at least three locations (e.g., a first water level confirmation part, a second water level confirmation part, and a third water level confirmation part) by using the water level sensor and the reagent probe, and has a function for confirming the levelness of the reaction tank or an apparatus on which the reaction tank is installed.

5 Claims, 7 Drawing Sheets

(52) U.S. Cl.
CPC . *G01N 35/1065* (2013.01); *G01N 2035/1025* (2013.01); *G01N 2035/1076* (2013.01)

(58) Field of Classification Search
CPC ... G01N 2035/1025; G01N 2035/1076; G01N 35/00623; G01N 2035/0441; G01N 2035/1048; G01F 23/0007; G01F 23/242; G01F 23/265; G01F 23/268
See application file for complete search history.

(56) References Cited

FOREIGN PATENT DOCUMENTS

| | | | |
|---|---|---|---|
| JP | H08-70997 A | * | 4/2000 |
| JP | 2007248413 A | * | 9/2007 |
| JP | 2012117950 A | * | 6/2012 |
| JP | 2013-064673 A | | 4/2013 |
| JP | 2016183913 A | | 10/2016 |
| JP | 2018128344 A | | 8/2018 |
| KR | 1020150026003 A | | 3/2015 |

OTHER PUBLICATIONS

JP-2007248413-A English Translation (Year: 2024).*
JP H08-70997 A English Translation (Year: 2024).*
International Search Report of PCT/JP2020/010145 dated Jun. 16, 2020.
International Preliminary Report on Patentability received in corresponding International Application No. PCT/JP2020/010145 dated Aug. 5, 2021.
Written Opinion received in corresponding International Application No. PCT/JP2020/010145 mailed Jun. 16, 2020.

* cited by examiner

# AUTOMATED ANALYSIS DEVICE AND METHOD FOR LEVELING SAME

TECHNICAL FIELD

The present invention relates to an automated analysis device for qualitative and quantitative analysis of a biological sample such as blood and urine, and a method for leveling the same.

BACKGROUND ART

As an example of an automated analysis device capable of easily performing leveling of a reaction tank and a method for leveling the same, PTL 1 discloses a technique of detecting a liquid surface of a heating medium with a plurality of dispensing probes, calculating position information based on a lowering distance, and leveling a reaction tank.

PTL 2 discloses a technique of bringing a plurality of sample probes and reagent probes into contact with metal and detecting the metal, and confirming a levelness based on a lowering distance.

CITATION LIST

Patent Literature

PTL 1: JP-A-2007-248413
PTL 2: JP-A-2016-183913

Technical Problem

The automated analysis device includes reaction tank water for maintaining a reaction solution obtained by mixing a sample and a reagent at a constant temperature, and a reaction tank filled with the reaction tank water. For the device to perform a stable analysis operation over a long time, it is necessary to maintain the levelness of the entire device and the reaction tank on the device.

However, the method disclosed in PTL 1 requires a large-scale mechanism or component, leading to an increase in device cost. In the method disclosed in PTL 2, the plurality of probes perform a dedicated operation, which is complicated for a service engineer who levels a device.

Based on such a background, there is a demand for a simpler method for leveling a device that prevents an increase in device cost and improves the service.

SUMMARY OF INVENTION

The invention is made to solve the above problem, and an object of the invention is to provide an automated analysis device having a simple configuration and capable of confirming a levelness of the device, and a method for leveling the same.

Solution to Problem

In order to achieve the above purpose, an automated analysis device of the invention includes a reaction disk, a reaction container constructed on the reaction disk, a reaction tank configured to immerse the reaction container in reaction tank water, a water level sensor configured to detect a water level in the reaction tank, a reagent probe configured to aspirate and discharge a reagent to the reaction container, and a control unit, in which the reagent probe includes, at a prescribed site, a water detection unit configured to detect presence of water, and is configured to detect the water level in the reaction tank, the reaction tank is provided with at least three water level confirmation portions, the control unit has a function of detecting a water level at one of the at least three water level confirmation portions in the reaction tank with the water level sensor provided at the water level confirmation portion, detecting water levels at the other water level confirmation portions in the reaction tank with reagent probe, and confirming a levelness of the reaction tank or the device on which the reaction tank is installed based on the detected water levels. Other aspects of the invention will be described in the following embodiments.

Advantageous Effect

According to the invention, it is possible to provide an automated analysis device having a simple configuration and capable of confirming a levelness of the device.

DESCRIPTION OF EMBODIMENTS

Embodiments for implementing the invention will be described in detail with reference to the drawings as appropriate.

First Embodiment

Figure 1:
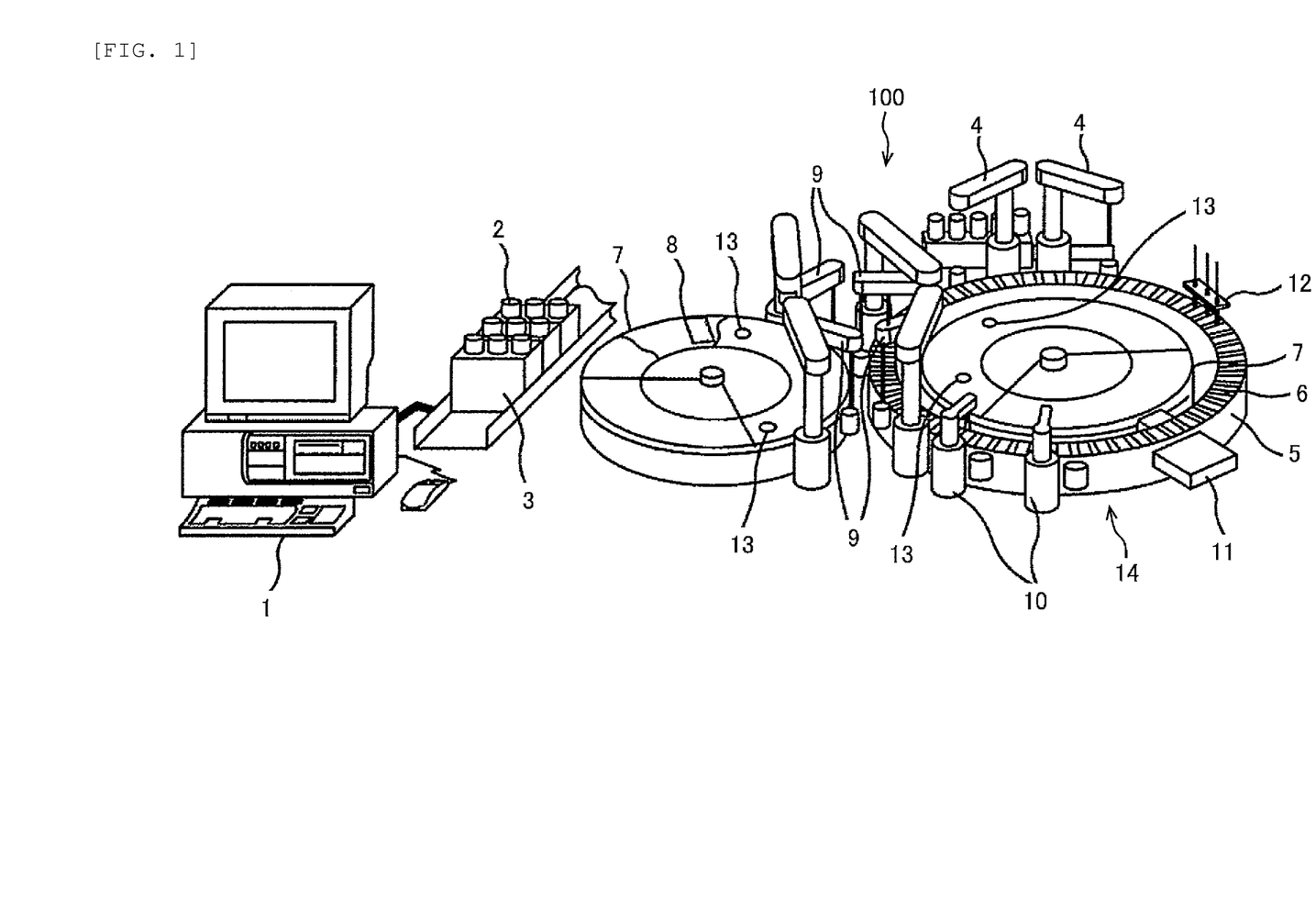
FIG. 1 is a schematic diagram showing an automated analysis device according to an embodiment.

FIG. 1 is a schematic diagram showing an automated analysis device 100 according to the present embodiment. The automated analysis device 100 includes a reaction disk 5, reaction containers 6 constructed on the reaction disk 5, a reaction tank 14 that immerses the reaction containers 6 in reaction tank water 15 (see FIG. 2), a water level sensor 19 (see FIG. 2) that detects a water level in the reaction tank 14, a plurality of reagent probes 9 that aspirate and discharge reagents to the reaction containers 6, and an operation unit PC1 (control unit). In the example of FIG. 1, four reagent probes 9 are provided.

The operation unit PC1 includes a display unit, an input unit, a central processing unit (CPU), a communication unit, an external storage unit, a memory, and a bus connecting these units. The display unit is a display or the like, and displays an execution state, an execution result, and the like of processing performed by the operation unit PC1. The input unit is a device such as a keyboard and a mouse for inputting an instruction to a computer, with which an instruction such as program activation is input. The central processing unit executes various programs stored in the memory. A communication control unit exchanges various types of data and commands with other devices via a LAN. The external storage unit stores various types of data for the operation unit PC1 to perform processing. The memory stores various programs and temporary data for the operation unit PC1 to perform the processing.

In response to an instruction from the operation unit PC1, sample containers 2 containing samples is transported to an analysis unit. The sample containers 2 are constructed on a transport rack 3. To perform analysis instructed from the operation unit PC1 on the samples transported to the analysis unit, measurement liquids in the sample containers 2 are aspirated by sample probes 4 and dispensed into the reaction containers 6 constructed on the reaction disk 5.

In response to the instruction from the operation unit PC1, reagent containers 8 constructed in a reagent refrigerator 7 are moved to a position of a lid opening 13 on a lid to aspirate predetermined reagents based on information on the reagent containers acquired in advance. Reagents in the reagent container are aspirated by the reagent probes 9 and dispensed into the reaction containers 6 on the reaction disk 5. The samples and the reagents that are injected into the reaction containers 6 are stirred by stirring mechanisms 10. The resultant color after such a chemical reaction is measured for analysis by a photometer 11 including a light source lamp, a spectroscopic diffraction grating, and a photodetector. For analysis of a next sample after the current analysis, the reaction containers 6 are cleaned by a cleaning mechanism 12. After the samples for analysis are aspirated, the transport rack 3 on which the sample containers 2 are constructed is transported out of the analysis unit.

In FIG. 1, a part of the lid of the reagent refrigerator 7 is cut out and a cross-section is shown, so that a part of a plurality of cooled reagent containers can be seen. The reagent refrigerator 7 cools the plurality of reagent containers filled with reagents and arranged on a circumference, and has at least one lid opening 13 for aspirating the reagents from the reagent containers.

Figure 2A:
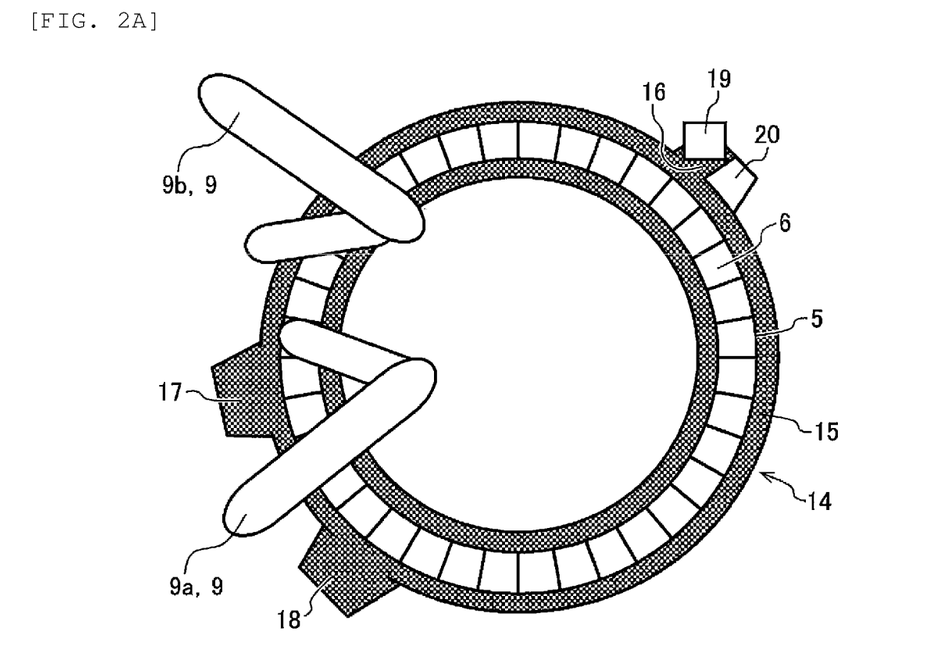
FIG. 2A is an arrangement diagram showing a reaction disk and reaction containers of the automated analysis device according to the present embodiment.
Figure 2B:
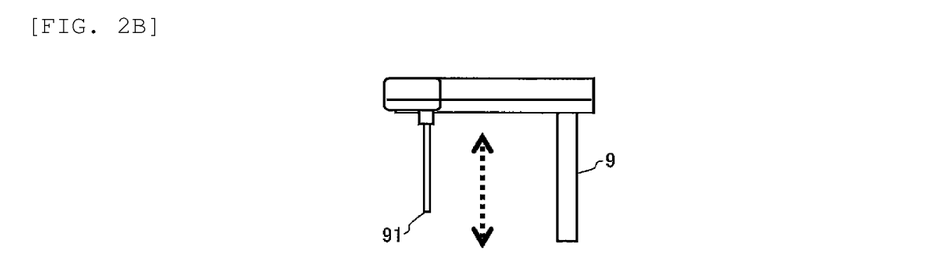
FIG. 2B is a schematic diagram of a reagent probe according to the present embodiment.
Figure 2C:
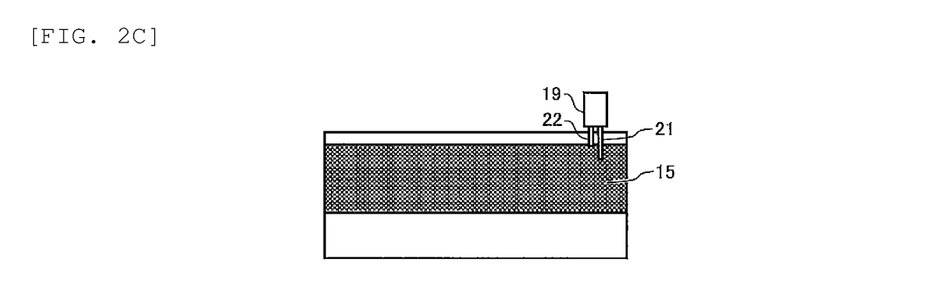
FIG. 2C is a schematic diagram of a water level sensor according to the present embodiment.

FIG. 2A is an arrangement diagram showing the reaction disk 5 and the reaction containers 6 of the automated analysis device 100 according to the present embodiment. FIG. 2B is a schematic diagram of the reagent probe 9 according to the present embodiment. FIG. 2C is a schematic diagram of the water level sensor 19 according to the present embodiment. As described above, the reaction containers 6 are constructed on the reaction disk 5 shown in FIG. 2A, and the plurality of reaction containers 6 are coupled. The reaction containers 6 are located inside the reaction tank 14. The reaction tank 14 is filled with the reaction tank water 15. The reaction tank water 15 is maintained at a constant temperature of about 37° C., so that the chemical reaction of the samples and the reagents is stable.

Among the four reagent probes 9, an R1-B reagent probe 9a and an R2-B reagent probe 9b are shown for aspirating reagents constructed in the reagent refrigerator 7 located on an inner side relative to the reaction disk 5. The R1-B reagent probe 9a has a function of aspirating and dispensing a first reagent, and the R2-B reagent probe 9b has a function of aspirating and dispensing a second reagent. As shown in FIG. 2B, all of the four reagent probes 9 are movable in a vertical direction.

As shown in FIG. 2B, each of the reagent probes 9 of the present embodiment includes a water detection unit 91 at a prescribed site and can detect a water level in the reaction tank 14. The water detection unit 91 detects the presence of water.

The reaction tank 14 is provided with a first water level confirmation portion 16, a second water level confirmation portion 17, and a third water level confirmation portion 18. The water level sensor 19 is attached to the first water level confirmation portion 16, and a water level of the reaction tank water 15 is monitored by a contact sensor including an electrode to keep the water level constant. In the present embodiment, a contact sensor is described, and any type of sensor may be used as long as the sensor can confirm the water level, such as an ultrasonic wave sensor, a sound wave sensor, a laser sensor, a camera sensor, and an imaging sensor.

The first water level confirmation portion 16 is provided with a drain port 20 so that the reaction tank water does not overflow even when the water level rises excessively for a certain reason. The drain port 20 has such a configuration that the reaction tank water forcibly flows out from the drain port when the water level reaches a certain level or more. In this way, the reaction tank water does not overflow from the reaction tank.

As shown in FIG. 2C, the contact sensor used for the water level sensor 19 includes at least two electrodes (a first electrode 21 having a large length and a second electrode 22 having a small length) having different lengths. In FIG. 2C, two electrodes having different lengths are described, and three or more electrodes may be used. The electrodes are brought into contact with the reaction tank water 15 to detect the water level of the reaction tank water 15 according to a change in capacitance, a change in conductivity, or the like. The first electrode 21 is used to confirm a levelness, and the second electrode 22 is used to detect a water level (normal water level) used for performing a normal device analysis operation. FIG. 2C shows a state in which the levelness of the device is confirmed, the reaction tank water 15 is supplied to the normal water level, and the device is ready to perform the analysis operation.

Next, a configuration of the water level sensor 19 will be described with reference to FIG. 3.

Figure 3:
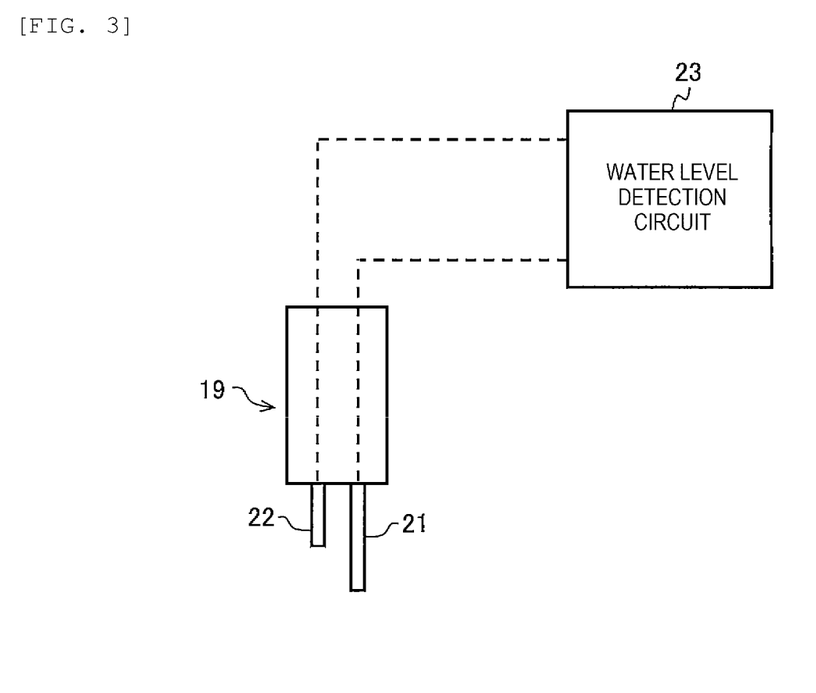
FIG. 3 is a configuration diagram showing the water level sensor according to the present embodiment.

FIG. 3 is a configuration diagram showing the water level sensor 19 according to the present embodiment. The water level sensor 19 is connected to a water level detection circuit 23 on a substrate in the device. The first electrode 21 and the second electrode 22 are also connected to the water level detection circuit 23. For example, when the water level sensor 19 is a capacitance sensor, the water level detection circuit 23 may determine a change in capacitance when an electrode comes into contact with the reaction tank water 15 with a liquid surface detection IC, and determine whether the water level is detected. In addition, when the water level sensor 19 is a conductivity sensor, a ground (GND) electrode may be added, and then the water level detection circuit 23 may determine whether the water level is detected by determining whether a threshold value is exceeded by a comparator. The IC is an abbreviation for integrated circuit.

Methods in the related art will be described. The first electrode 21 was used to detect a minimum water level of the reaction tank water 15 required for the device analysis operation. The second electrode 22 was used to detect the water level (normal water level) used for the device analysis operation as described above. Both of the electrodes and the water amount and the water level of the reaction tank water when a liquid surface is detected are set to reference values (reference positions) for the device.

In contrast, a feature of the present embodiment is that leveling is performed based on a reference position of the water level sensor 19. As in PTL 1, when the leveling is performed using only the plurality of reagent probes 9 or sample probes, it is difficult to determine a reference position, and the leveling of the device is basically performed while correcting a detected relative position. In the present embodiment, by also using the water level sensor 19, which is mounted for the purpose of detecting the water level of the reaction tank water 15, as a reference position for leveling the device, the leveling of the device is implemented by a simple method and configuration without increasing the cost of the device.

PTL 1 discloses that a liquid surface sensor that detects a liquid surface of a heating medium in the reaction tank "outputs a liquid surface detection signal to a control unit of an analysis control unit. The control unit that received the liquid surface detection signal from the liquid surface sensor operates a supply pump when the liquid surface of the heating medium in the leveled reaction tank is higher than a mixed liquid in a reaction container and lower than a preset normal height" (paragraph 0040), and does not disclose that the liquid surface detection signal of the liquid surface sensor is used for leveling.

Figure 4A:
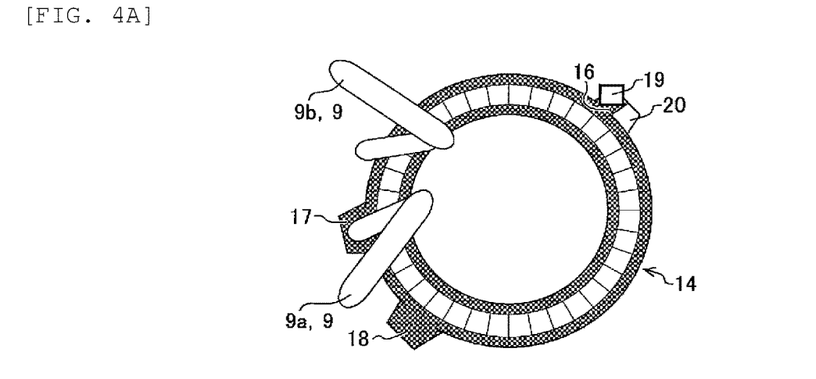
FIG. 4A is a schematic diagram showing a leveling operation (1) of the automated analysis device according to the present embodiment.
Figure 4B:
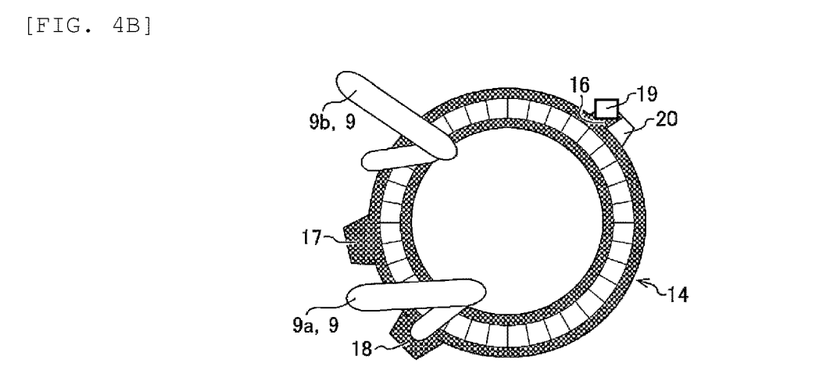
FIG. 4B is a schematic diagram showing the leveling operation (2) of the automated analysis device according to the present embodiment.
Figure 4C:
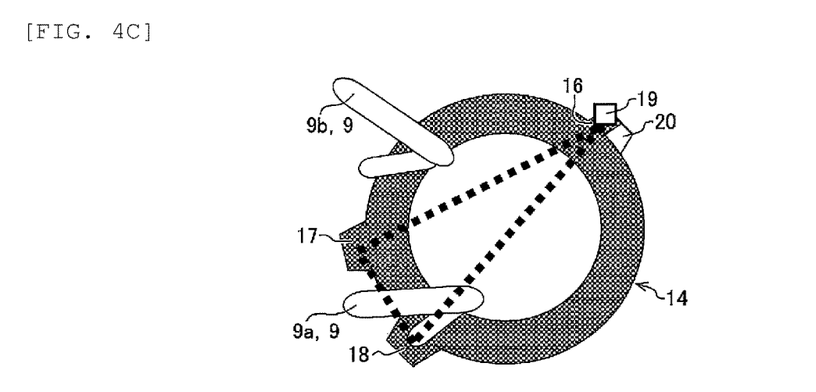
FIG. 4C is a schematic diagram showing the leveling operation (3) of the automated analysis device according to the present embodiment.
Figure 4D:
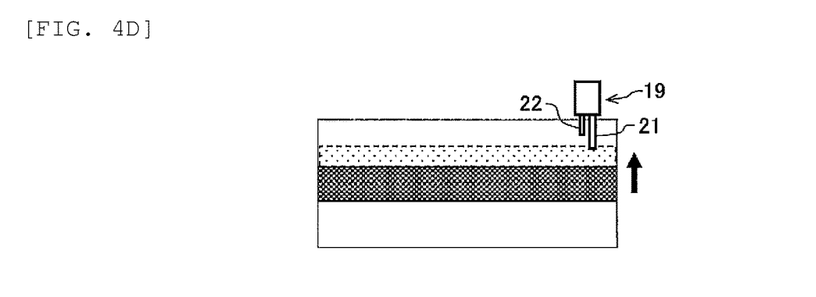
FIG. 4D is a diagram showing a state of water level detection by the water level sensor.

FIG. 4A is a schematic diagram showing an operation (1) of the leveling of the automated analysis device 100 according to the present embodiment. FIG. 4B is a schematic diagram showing an operation (2) of the leveling of the automated analysis device 100 according to the present embodiment. FIG. 4C is a schematic diagram showing an operation (3) of the leveling of the automated analysis device 100 according to the present embodiment. FIG. 4D is a diagram showing a state of the water level detection performed by the water level sensor 19. A method for performing the leveling of the automated analysis device 100 will be described with reference to FIGS. 4A, 4B, 4C, 4D, and 5. FIGS. 1 to 3 are referred to as appropriate.

When the automated analysis device 100 is powered on, a service engineer performs a maintenance item of "initial leveling" from an operation unit menu of the operation unit PC1. First, the reaction tank water 15 starts to be supplied to the reaction tank 14, and the water level gradually rises. When the water level reaches a certain height, first, as shown in FIG. 4D, the first electrode 21 of the water level sensor 19 comes into contact with a surface of the reaction tank water 15 to detect that the water level reached the certain height. Then, the water supply is stopped. At this time, by detecting the water level by the water level sensor 19, the water amount of the reaction tank water (for example, detected at 1.5 liters out of 2 liters) in a horizontal state can be identified by the device.

Next, as shown in FIG. 4A, the R1-B reagent probe 9a moves to a position above the second water level confirmation portion 17, and then the reagent probe 9 (R1-B reagent probe 9a) is lowered. A tip end of the reagent probe 9 is an electrode sensor (water detection unit 91), and the water level is detected by bringing the tip end of the reagent probe into contact with the reaction tank water 15. When the water level is detected, the reagent probe 9 stops the lowering operation temporarily and then rises and returns to an original position. Here, based on the lowering amount of the reagent probe 9, a height of the water level can be known and the water amount at the second water level confirmation portion 17 during leveling can be specified. A difference between the water level detected by the water level sensor at the first water level confirmation portion 16 and the water level detected by the reagent probe at the second water level confirmation portion 17 is recognized (stored) by the device.

Next, similarly to the operation performed by the second water level confirmation portion 17, as shown in FIG. 4B, the R1-B reagent probe 9a moves to a position above the third water level confirmation portion 18, and then the reagent probe 9 is lowered. When the reagent probe 9 is lowered and the water level is detected, the reagent probe 9 stops the lowering operation temporarily and then rises and returns to the original position. Here, a difference between the water level detected by the water level sensor 19 at the first water level confirmation portion 16, the water level detected by the reagent probe 9 at the second water level confirmation portion 17, and the water level detected by the reagent probe 9 at the third water level confirmation portion 18 is recognized (stored) by the device.

As shown in FIG. 4C, the operation unit PC1 confirms the water levels at three locations including the first water level confirmation portion 16, the second water level confirmation portion 17, and the third water level confirmation portion 18 to define a plane and calculate the levelness of the device with the water levels based on the plane. Regarding a leveling result, when the device is leveled based on the plane configuration of the three locations, the display unit of the operation unit PC1 displays that the device is leveled, and the supply of the reaction tank water 15 is restarted. When the water is supplied to a position where the water level sensor 19 detects the normal water level, the water supply is stopped and the maintenance item of the "initial leveling" is ended.

When the device is not leveled, a current device inclination and adjuster feet that can be corrected and leveled are specified based on the recognized difference in water level height, and the service engineer is notified via the operation unit PC1 that positions of the adjuster feet of the device are adjusted and the leveling is completed.

Figure 5:
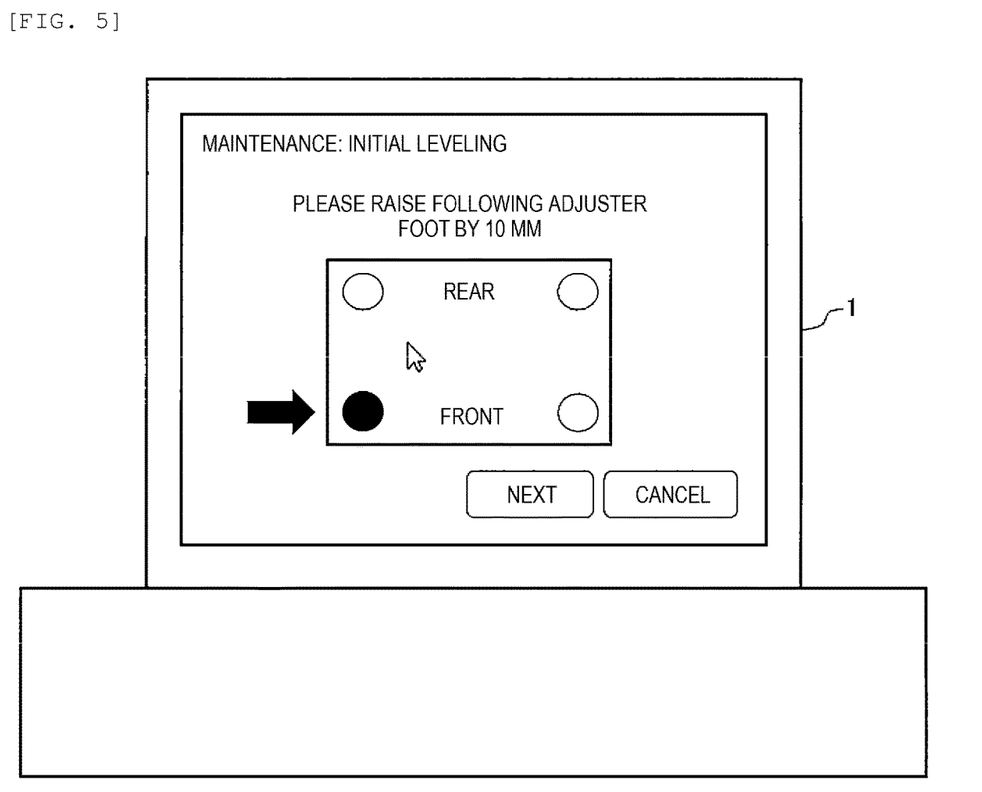
FIG. 5 is a schematic diagram showing an example of UI display on a display unit of an operation unit PC during the leveling operation according to the present embodiment.

FIG. 5 is a schematic diagram showing an example of UI display on the display unit of the operation unit PC1 during the leveling operation according to the present embodiment. The service engineer adjusts the adjuster feet according to the display on the operation unit PC1. The adjuster feet are provided at four locations below the reaction tank 14 or the device on which the reaction tank 14 is installed.

A display screen of the display unit in FIG. 5 displays positions and degrees of the adjuster feet to be raised or lowered. Specifically, based on a display of "please raise lower left adjuster foot by 10 mm", it is possible to easily understand that a lower left part (left front side) of the device is lowered.

After the adjuster feet are adjusted, the R1-B reagent probe 9a may redetect the water levels at the second water level confirmation portion 17 and the third water level confirmation portion 18 to reconfirm whether the leveling is correctly performed.

Before the reconfirmation, once the reaction tank water 15 is slightly discharged and the water level is lowered, the process may return to the step of confirming the water level by the first electrode 21 from the water level sensor 19 of the first water level confirmation portion 16 and continue the maintenance. In addition, an antibacterial agent or the like may be added to the reaction tank water 15 to prevent propagation of bacteria and the like.

The operations in FIGS. 4A, 4B, and 4C will be further described.

Figure 6:
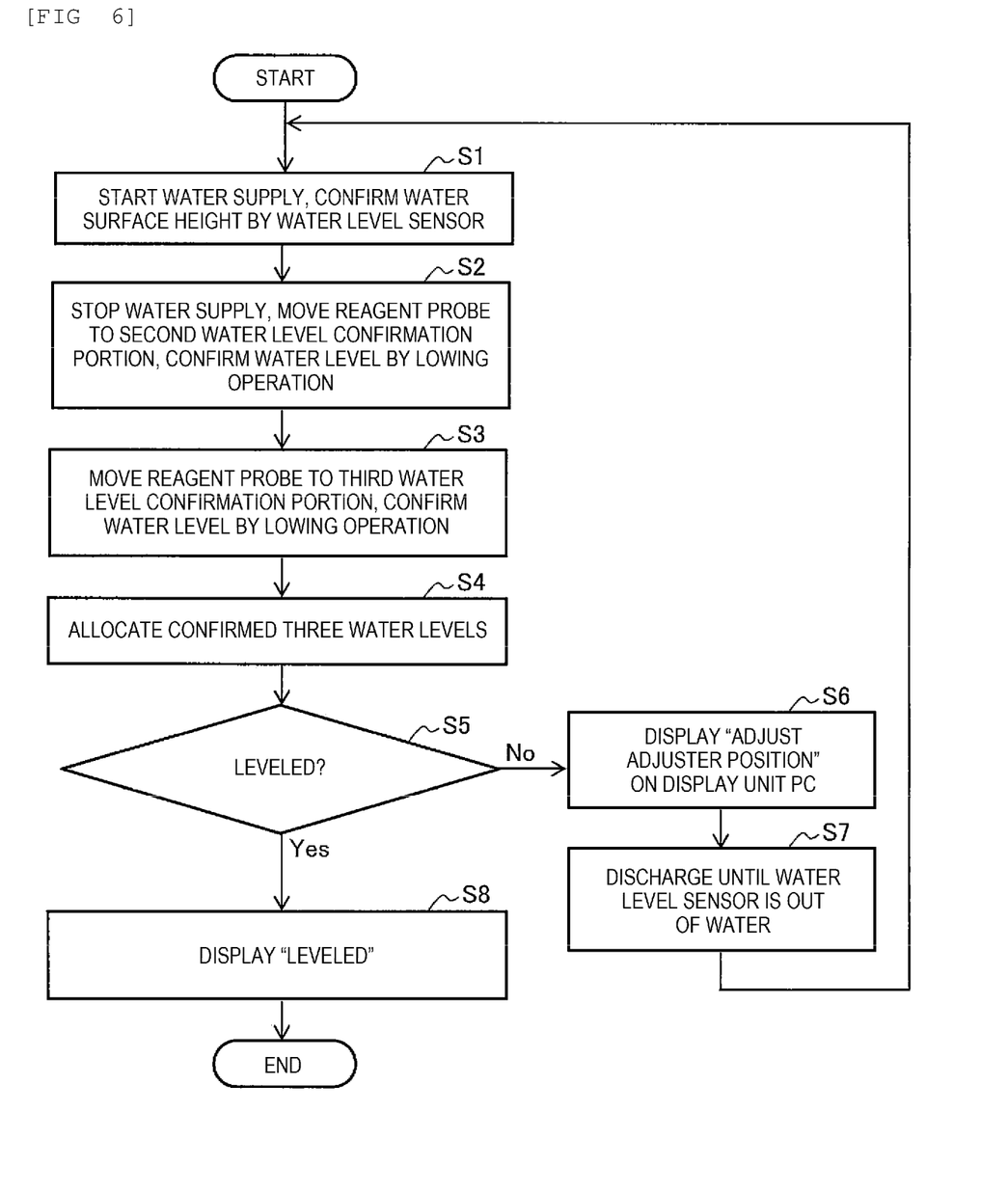
FIG. 6 is a flowchart showing leveling of the automated analysis device according to the present embodiment.

FIG. 6 is a flowchart showing the leveling of the automated analysis device 100 according to the present embodiment. The operation unit PC1 starts water supply, and confirms a water surface height of the reaction tank 14 with the water level sensor 19 (step S1). Next, the R1-B reagent probe 9a moves to a position above the second water level confirmation portion 17, and then the reagent probe 9 (R1-B reagent probe 9a) is lowered. The water level is confirmed by bringing a tip end of the reagent probe into contact with the reaction tank water 15 (step S2). Next, the R1-B reagent probe 9a moves to a position above the third water level confirmation portion 18, and then the reagent probe 9 is lowered. The water level is confirmed by bringing the tip end of the reagent probe into contact with the reaction tank water 15 (step S3).

The operation unit PC1 checks the confirmed three water levels (step S4), and determines whether the water surface is leveled (step S5). When the water surface is leveled (step S5, Yes), the operation unit PC1 displays that the water surface is leveled on the display unit (step S8) and ends the leveling.

When the water surface is not leveled (step S5, No), the operation unit PC1 displays on the display unit "adjust adjuster position" (step S6). Next, when a service engineer receives an instruction of restarting the leveling, the operation unit PC1 issues an instruction of discharging the reaction tank water 15 in the reaction tank 14 until a water level at which the water level sensor 19 cannot detect the water level (out of water) (step S7), and the process returns to step S1.

According to the present embodiment, the operation unit PC1 (the control unit) confirms the levelness of the device, and then displays on the display unit a result indicating that the levelness of the device is within a predetermined range, and displays on the display unit "perform leveling" when the levelness of the device is out of the predetermined range. Accordingly, the service engineer can understand a current state of the device and appropriately perform levelness adjustment.

In the present embodiment, a confirming result of the levelness is displayed on the display unit, and the invention is not limited thereto. For example, "please raise lower left adjuster foot on front side by 10 mm" may be known via sound.

According to the configuration described above, it is possible to provide the automated analysis device 100 having a simple device configuration and a single reagent probe 9 provided with a function of leveling the device without large-scale mechanisms or components or a plurality of probes performing a dedicated operation. In addition, the service engineer can level the device by adjusting the adjuster feet in accordance with the display on the operation unit PC1 (the operation unit), and the serviceability is improved.

Second Embodiment

The first embodiment described the maintenance item of "initial leveling", and the present embodiment describes a periodic maintenance item that is periodically performed on a device by a service engineer.

Figure 7:
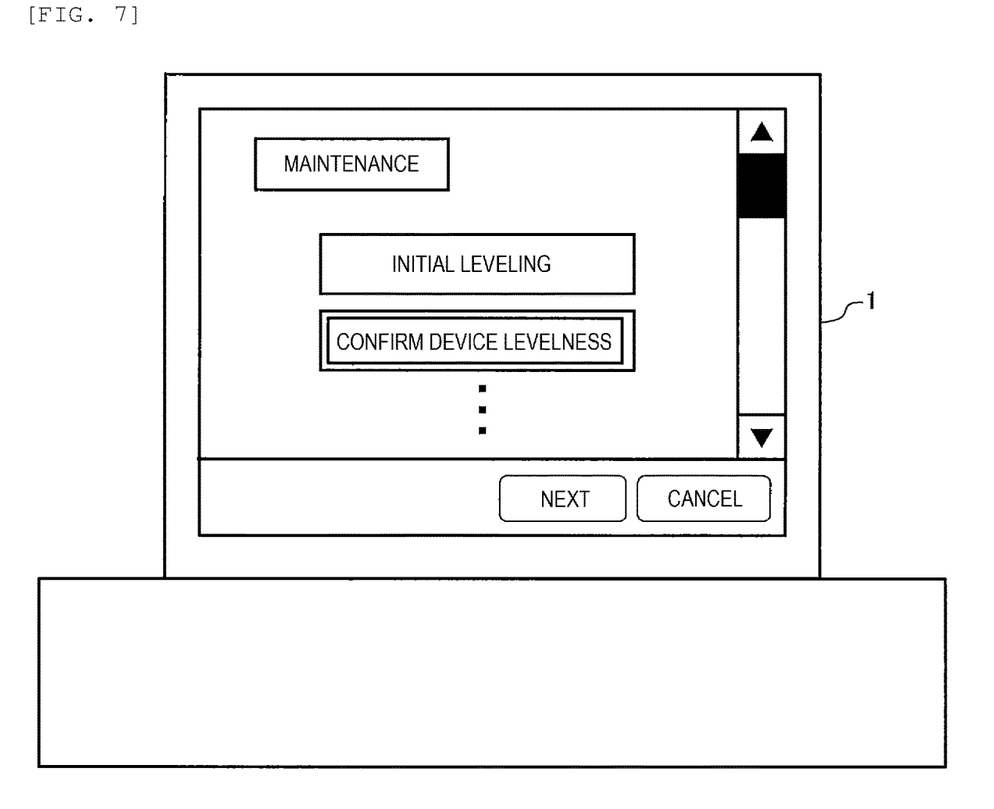
FIG. 7 is a schematic diagram showing a maintenance selection screen according to the present embodiment.

FIG. 7 is a schematic diagram showing a maintenance selection screen according to the present embodiment. In the second embodiment, a maintenance item of "device levelness confirmation" is added to a maintenance item that can be performed on the device. In FIG. 7, when the "device levelness confirmation" is selected, the item is displayed in a double frame, and when a "next" button is pressed, the execution is started.

In this case, the reaction tank water 15 was supplied to a reaction tank to a normal water level, and the device is in a state where the maintenance can be performed. In this case, the maintenance of the "device levelness confirmation" is performed. Since the water level sensor 19 detected a water level, the reaction tank water 15 is slightly discharged after the maintenance is performed, and the water level sensor 19 is out of a state where the water level sensor 19 detects both the normal water level and a water level for confirming a levelness. Thereafter, water is supplied again and the water level is detected by the first electrode 21 of the water level sensor 19, and then the water level is detected at the second water level confirmation portion 17 and the third water level confirmation portion 18 by the R1-B reagent probe 9a to confirm that there is no positional deviation.

When no positional deviation is found, the operation unit PC1 displays on a display unit that the device is leveled, notifies the service engineer, and ends the maintenance item. When the positional deviation is found for some reason, the operation unit PC1 displays on the display unit "adjust adjuster foot" based on the levelness of a plane configuration of three locations. When the service engineer confirmed the device levelness by performing the adjustment in accordance with screen display, the display unit displays that the operation unit PC1 is leveled, and the service engineer ends the maintenance item of the "device levelness confirmation".

A result of the device levelness confirmation may be left as a maintenance log in the device. By periodically performing the device levelness confirmation, it is possible to perform a stable analysis operation over a long time when the levelness is maintained.

The operation unit PC1 (the control unit) may record the maintenance log of leveling the device and determine whether the levelness of the device is maintained based on a result of periodical leveling. When it is determined that a deviation occurs in the levelness due to a certain reason, for example, a slight sinking of a floor, an alert is displayed on the operation unit PC when the maintenance of the "device levelness confirmation" is performed, and the levelness is maintained by adjusting the adjuster feet. It is possible to perform the stable analysis operation over a long time in this way.

A method for leveling the automated analysis device 100 of the present embodiment is a method for leveling an automated analysis device including a reaction disk 5, a reaction container 6 constructed on the reaction disk 5, a reaction tank 14 configured to immerse the reaction container 6 in reaction tank water 15, a water level sensor 19 configured to detect a water level in the reaction tank 14, a reagent probe 9 configured to aspirate and discharge a reagent to the reaction container 6, and a control unit. The reagent probe 9 includes, at a prescribed site, a water detection unit 91 configured to detect presence of water, and is configured to detect the water level in the reaction tank 14. The reaction tank 14 is provided with at least three water level confirmation portions. The control unit is configured to detect a water level at one of the at least three water level confirmation portions in the reaction tank 14 with the water level sensor 19 provided at the water level confirmation portion, detect water levels at the other water level confirmation portions in the reaction tank 14 with the reagent probe 9, and confirm a levelness of the device on which the reaction tank 14 is installed based on the detected water levels. According to the above configuration, the levelness of the device can be confirmed by a simple method.

Although the embodiments of the invention have been described above, the invention is not limited to the above embodiments. The invention can be modified in various ways without departing from the gist thereof. For example, the leveling is performed by the operation unit PC1, and the leveling may also be performed by a maintenance PC of the service engineer.

In addition, in FIGS. 4A to 4C of the present embodiment, the R1-B reagent probe 9a confirms the water level at the second water level confirmation portion 17, and the R1-B reagent probe 9a further confirms the water level at the third water level confirmation portion 18, and the invention is not limited thereto. For example, the R2-B reagent probe 9b may confirm the water level at the second water level confirmation portion 17, and the R1-B reagent probe 9a may confirm the water level at the third water level confirmation portion 18.

REFERENCE SIGN LIST 1 operation unit PC (control unit)
2 sample container
3 transport rack
4 sample probe
5 reaction disk
6 reaction container
7 reagent refrigerator
8 reagent container
9 reagent probe
9a R1-B reagent probe
9b R2-B reagent probe
10 stirring mechanism
11 photometer
12 cleaning mechanism
13 lid opening
14 reaction tank
15 reaction tank water
16 first water level confirmation portion
17 second water level confirmation portion
18 third water level confirmation portion
19 water level sensor
20 drain port
21 first electrode
22 second electrode
23 water level detection circuit
91 water detection unit
100 automated analysis device (device)

The invention claimed is:
1. An automated analysis device comprising:
a reaction disk;
a reaction container;
a reaction tank;
a water level sensor;
a reagent probe;
a water detection unit; and
a control unit,
wherein the reaction probe includes the water detection unit disposed within a prescribed site and is configured to detect a reaction tank water level,
wherein the reaction container is disposed on the reaction disk,
wherein the reaction tank is disposed on a support device and is configured to immerse the reaction container in the reaction tank,
wherein the water level sensor is configured to detect the reaction tank water level,
wherein the reaction tank comprises three or more water level confirmation portions in the reaction tank, and
wherein the control unit is configured to:
detect the reaction tank water level in a first water level confirmation portion of the three or more water level confirmation portions using the water level sensor disposed in the first water level confirmation portion,
detect water levels at a second water level confirmation portion or further water level confirmation portions of the three or more water level confirmation portions using the reagent probe, and
confirm a reaction tank levelness or a support device levelness based on the detected reaction tank water levels.

2. The automated analysis device according to claim 1, further comprising:
a display,
wherein the control unit is further configured to:
confirm the levelness of the support device, and when the levelness of the support device is within a predetermined range, display on the display a corresponding result, and
when the levelness of the support device is outside the predetermined range, display on the display an instruction instructing to perform leveling.

3. The automated analysis device according to claim 1, wherein the control unit is further configured to reconfirm the levelness of the support device by redetecting water levels in the first water level confirmation portion and in the second water level confirmation portion or further water level confirmation portions of the three or more water level confirmation portions after an adjustment for leveling the support device is performed.

4. The automated analysis device according to claim 1, wherein the control unit is further configured to record a maintenance log indicative of the leveling of the support device and to determine whether the support device is maintained leveled based on a result of periodical leveling.

5. A method of leveling the automated analysis device of claim 1, the method comprising:
detecting the reaction tank water level in the first water level confirmation portion of the three or more water level confirmation portions using the water level sensor disposed in the first water level confirmation portion and the control unit;
detecting water levels at the second water level confirmation portion or further water level confirmation portions of the three or more water level confirmation portions using the reagent probe and the control unit; and
confirming a reaction tank levelness or a support device levelness based on the detected reaction tank water levels using the control unit.

* * * * *